United States Patent
Mitani et al.

(10) Patent No.: US 8,434,452 B2
(45) Date of Patent: May 7, 2013

(54) CONTROL DEVICE FOR INTERNAL COMBUSTION ENGINE

(75) Inventors: Shinichi Mitani, Susono (JP); Shigemasa Hirooka, Susono (JP); Takashi Tsunooka, Gotenba (JP); Akira Satou, Susono (JP); Shigeyuki Urano, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 79 days.

(21) Appl. No.: 13/264,215

(22) PCT Filed: Apr. 16, 2009

(86) PCT No.: PCT/JP2009/057669
§ 371 (c)(1),
(2), (4) Date: Oct. 13, 2011

(87) PCT Pub. No.: WO2010/119544
PCT Pub. Date: Oct. 21, 2010

(65) Prior Publication Data
US 2012/0035830 A1 Feb. 9, 2012

(51) Int. Cl.
*F02D 41/00* (2006.01)
*F01N 3/02* (2006.01)

(52) U.S. Cl.
USPC .................................. 123/339.24; 60/320

(58) Field of Classification Search ............. 123/339.1, 123/339.22, 339.24, 349, 393, 672, 676, 123/680, 568.12; 60/320, 321; 73/114.69; 701/108
See application file for complete search history.

(56) References Cited

U.S. PATENT DOCUMENTS

| | | | | |
|---|---|---|---|---|
| 4,434,760 A * | 3/1984 | Kobayashi et al. | ........... | 477/111 |
| 5,806,486 A * | 9/1998 | Gee et al. | ................. | 123/339.22 |
| 6,662,551 B2* | 12/2003 | Majima | .......................... | 60/284 |
| 6,823,839 B2* | 11/2004 | Yasui et al. | .............. | 123/339.12 |
| 2006/0016180 A1* | 1/2006 | Tomita et al. | ................... | 60/297 |
| 2011/0231081 A1* | 9/2011 | Suzuki et al. | ................. | 701/104 |

FOREIGN PATENT DOCUMENTS

| JP | A-63-208607 | 8/1988 |
|---|---|---|
| JP | A-2005-188352 | 7/2005 |
| JP | A-2007-132313 | 5/2007 |
| JP | A-2008-111414 | 5/2008 |
| JP | A-2008-274885 | 11/2008 |

OTHER PUBLICATIONS

International Search Report dated Jul. 28, 2009 in International Application No. PCT/JP2009/057669 (with translation).

* cited by examiner

*Primary Examiner* — Thomas Moulis
(74) *Attorney, Agent, or Firm* — Oliff & Berridge, PLC

(57) ABSTRACT

A control device for an internal combustion engine according to the present embodiment, includes: cooling units 40L and 40R arranged on a path where a coolant is circulated, and cooling an exhaust gas of the internal combustion engine with the coolant flowing through the cooling units 40L and 40R; and ECUs 7L and 7R estimating a heat quantity of the exhaust gas, and deciding whether or not to prohibit an idle reduction control in response to the estimated heat quantity of the exhaust gas.

3 Claims, 12 Drawing Sheets

CONTROL DEVICE FOR INTERNAL COMBUSTION ENGINE

TECHNICAL FIELD

The present invention relates to a control device for an internal combustion engine.

BACKGROUND ART

There is a cooling unit for cooling exhaust gases of an internal combustion engine. There is the cooling unit which is provided between an exhaust port and an exhaust manifold or which is provided around the exhaust manifold (See Patent Document 1). The exhaust gases are cooled with coolant water flowing through the cooling unit.

PRIOR ART DOCUMENT

Patent Document

[Patent Document 1] Japanese Patent Application Publication No. 63-208607

SUMMARY OF THE INVENTION

Problems to be Solved by the Invention

Such a cooling unit is arranged on a path through which a coolant flows. The coolant is circulated through the path by a mechanical pump. Also, such a cooling unit stores a part of the heat quantity of the exhaust gas. When the idle reduction control is performed in the internal combustion, the pump is stopped and then the coolant is not circulated. For this reason, the heat quantity stored in the cooling unit is transmitted to the coolant, and then the coolant might boil.

It is an object of the present invention to provide a control device of an internal combustion engine suppressing boiling of a coolant.

Means for Solving the Problems

The above object is achieved by a control device for an internal combustion engine, including: a cooling unit arranged on a path where a coolant is circulated, and cooling an exhaust gas of the internal combustion engine with the coolant flowing through the cooling unit; an estimation portion estimating a heat quantity of the exhaust gas; and a control portion deciding whether or not to prohibit an idle reduction control in response to the estimated heat quantity of the exhaust gas. With these arrangements, for example, in even cases where the heat quantity of the exhaust is high and the idle reduction control is prohibited, the pump for circulating the coolant is continuously operated to circulate the coolant, thereby preventing boiling of the coolant caused by the heat quantity stored in the cooling unit.

Effects of the Invention

According to the present invention, there is provided a control device of an internal combustion engine suppressing boiling of a coolant.

MODES FOR CARRYING OUT THE INVENTION

Embodiments will be described below with reference to the drawings.

First Embodiment

Figure 1:
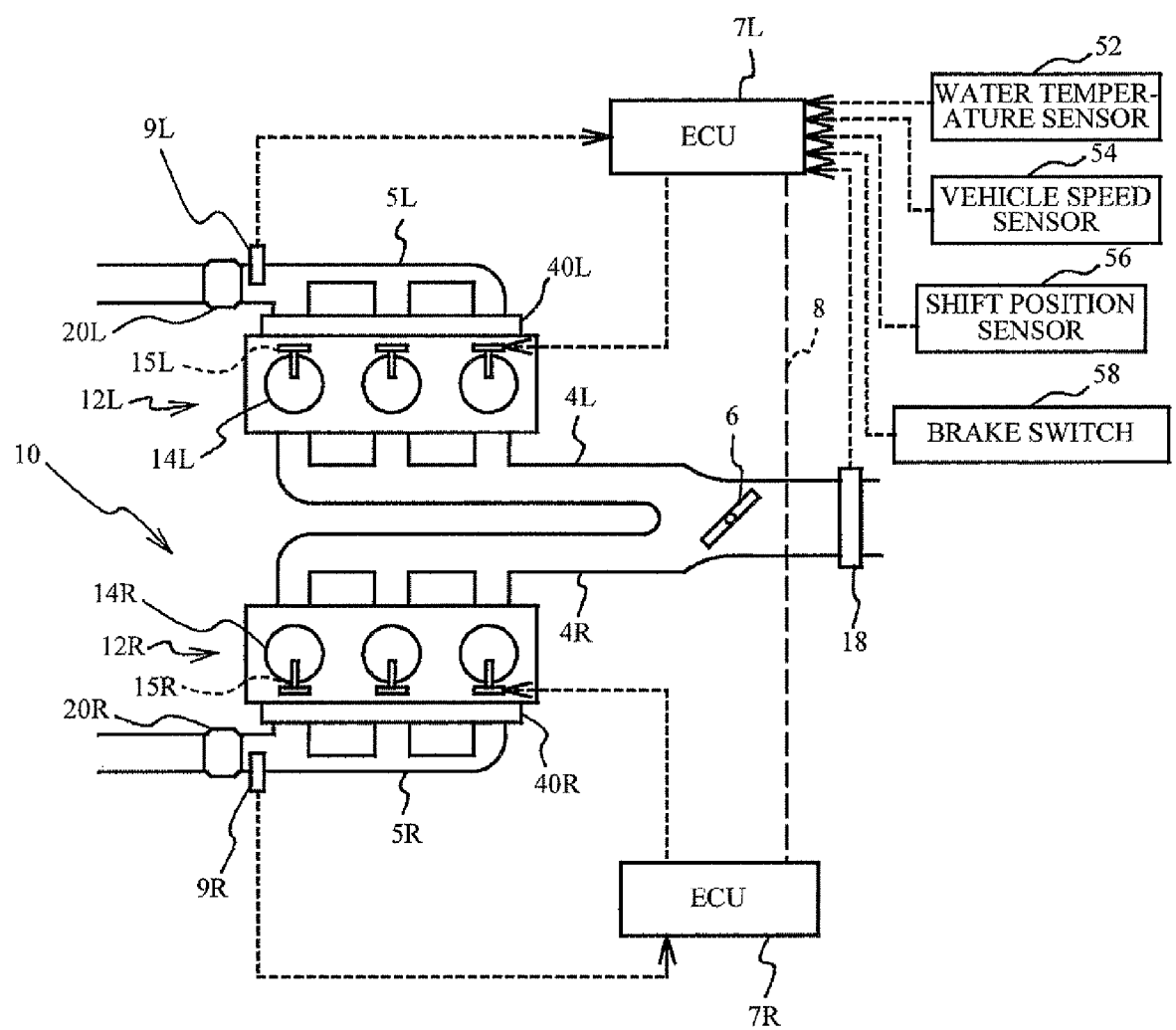
FIG. 1 is an explanatory view of a control device for an internal combustion engine.

FIG. 1 is an explanatory view of a control device for an internal combustion engine. An engine 10 has a pair of banks 12L and 12R. The banks 12L and 12R are arranged obliquely to each other. The engine 10 is a so-called V-type engine. The bank 12L has a cylinder group including three cylinders 14L. Likewise, the bank 12R has cylinders 14R.

Also, the bank 12L is provided with fuel injection valves 15L injecting fuel directly into the cylinders 14L. Likewise, the bank 12R is provided with fuel injection valves 15R injecting fuel directly into the cylinders 14R. An intake path 4L and an exhaust manifold 5L are connected to the bank 12L. An intake path 4R and an exhaust manifold 5R are connected to the bank 12R. The intake paths 4L and 4R are jointed to each other at their upstream sides. The jointed portion is provided with a throttle valve 6 for adjusting intake air quantity and an airflow meter for detecting the intake air quantity.

Catalysts 20L and 20R are provided at the lower ends of the exhaust manifolds 5L and 5R, respectively. The catalysts 20L and 20R clean the exhaust gases exhausted from the cylinders of the banks 12L and 12R, respectively. Air-fuel ratio sensors 9L and 9R are attached to the exhaust manifolds 5L and 5R, respectively.

A cooling unit 40L is provided between an exhaust port (not illustrated) of the bank 12L and the exhaust manifold 5L. Likewise, a cooling unit 40R is provided between an exhaust port (not illustrated) of the bank 12R and the exhaust manifold 5R.

The cooling units 40L and 40R are configured such that the coolant flows around pipes of the exhaust manifolds 5L and 5R respectively. The cooling units 40L and 40R will be described later in detail.

The opening degree of the throttle valve 6 is individually controlled for each of the banks 12L and 12R by electronic Control Units (ECUs) 7L and 7R, respectively. Also, the fuel quantities injected from the fuel injection valves 15L and 15R are individually controlled by the ECUs 7L and 7R, respectively. The ECUs 7L and 7R can cut fuel injected from the fuel injection valves 15L and 15R. The ECUs 7L and 7R correspond to an estimation portion, and a control portion, as will be described later in detail. The ECUs 7L and 7R can communicate to each other via a telecommunication line 8. In order to control operations of the banks for which the ECUs 7L and 7R are responsible, the ECUs 7L and 7R exchange information via the telecommunication line 8 to refer to information on an operating state of each bank.

Also, the air-fuel ratio sensors 9L and 9R output detection signals according to the air-fuel ratio of the exhaust gas to the ECUs 7L and 7R respectively. The ECUs 7L and 7R control each of the fuel injection quantities injected into the cylinders 14L and 14R based on the output signals from the air-fuel ratio sensors 9L and 9R respectively, so as to control the air-fuel ratio to be feed back. Such a control for feeding back the air-fuel ratio is to control the fuel injection quantity or the like such that the detected air-fuel ratio of the exhaust gas is identical to a target air-fuel ratio.

A water temperature sensor 52 outputs detection signals according to a temperature of the coolant, as will be described later, to the ECU 7L. Additionally, the water temperature sensor 52 is arranged at an arbitrary position on the path through which the coolant is circulated. A vehicle speed sensor 54 outputs detection signals according to the speed of the vehicle to the ECU 7L. A shift position sensor 56 outputs detection signals according to the position of a shift lever (not illustrated) to the ECU 7L. A brake switch 58 outputs an ON signal and a OFF signal of a brake pedal (not illustrated) to the ECU 7L.

The ECUs 7L and 7R can perform an idle reduction control. The idle reduction control is as follows. The ECUs 7L and 7R stop the engine 10, when deciding that the vehicle speed is zero, the position of the shift lever is neutral, and the brake switch 58 is in the ON state based on the vehicle speed from the vehicle speed sensor 54, the position of the shift lever from the shift position sensor 56, and the signal from the brake switch 58.

In contrast, the ECUs 7L and 7R start the engine 10, when deciding the shift position is the drive D or the brake switch 58 is in the OFF state based on the position of the shift lever from the shift position sensor 56, and the signal from the brake switch 58 after the engine 10 is stopped. Such an idle reduction control reduces fuel consumption.

Figure 2:
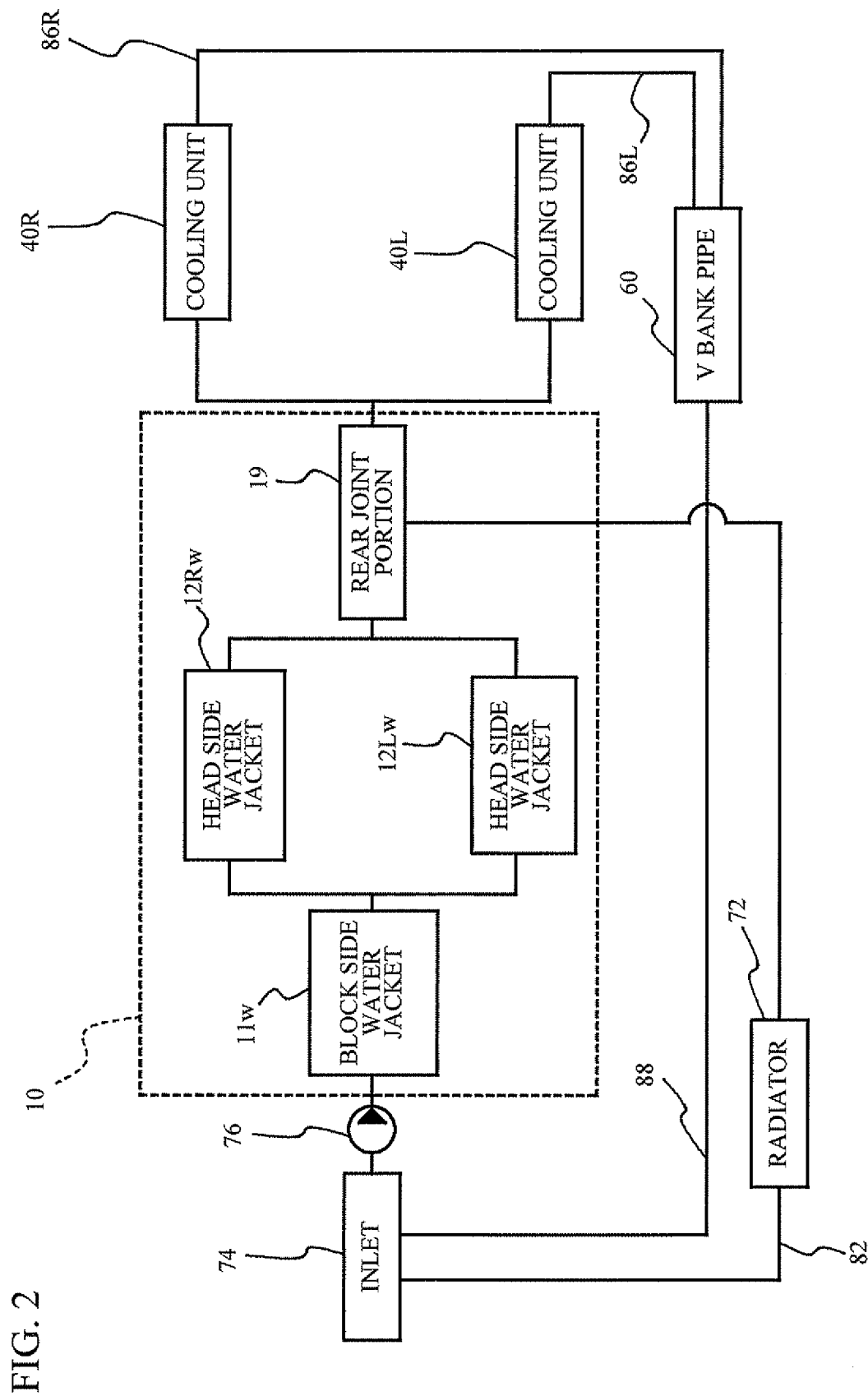
FIG. 2 is a view of a path of a coolant.

FIG. 2 is a view of a path of the coolant. As illustrated in FIG. 2, a radiator 72, an inlet 74, a pump 76, and the like are arranged on the path of the coolant. A main path 82 circulates the coolant through the inlet 74, the pump 76, the engine 10, and the radiator 72, in this order. The main path 82 circulates the coolant to the radiator 72 from a rear joint portion 19 of the engine 10. A supporting path 88 circulates the coolant through the inlet 74, the pump 76, the engine 10, the cooling units 40L and 40R, and a V bank pipe 60, in this order. The supporting path 88 diverges from the rear joint portion 19, and includes divergence paths 86L and 86R which circulate the coolant through the cooling units 40L and 40R respectively.

The pump 76 is a mechanical pump which operates in conjunction with the revolution of the engine 10. The coolant flows from the inlet 74 to the engine 10. The coolant flows into a block side water jacket 11w of the engine 10 at first, and then flows into head side water jackets 12Lw and 12Rw. The coolants discharged from the head side water jackets 12Lw and 12Rw join together at the rear joint portion 19. The main path 82 and the supporting path 88 are connected to the rear joint portion 19. The coolant flowing through the main path 82 flows from the rear joint portion 19 to the radiator 72, and radiates heat in the radiator 72.

The cooling unit 40L is arranged on the divergence path 86L. The coolant flows through the cooling unit 40L. The coolant flows through the cooling unit 40L, thereby reducing a temperature of the exhaust gas exhausted from the cylinders 14L of the bank 12L. Likewise, these arrangements are applicable to the divergence path 86R and the cooling unit 40R.

Figure 3:
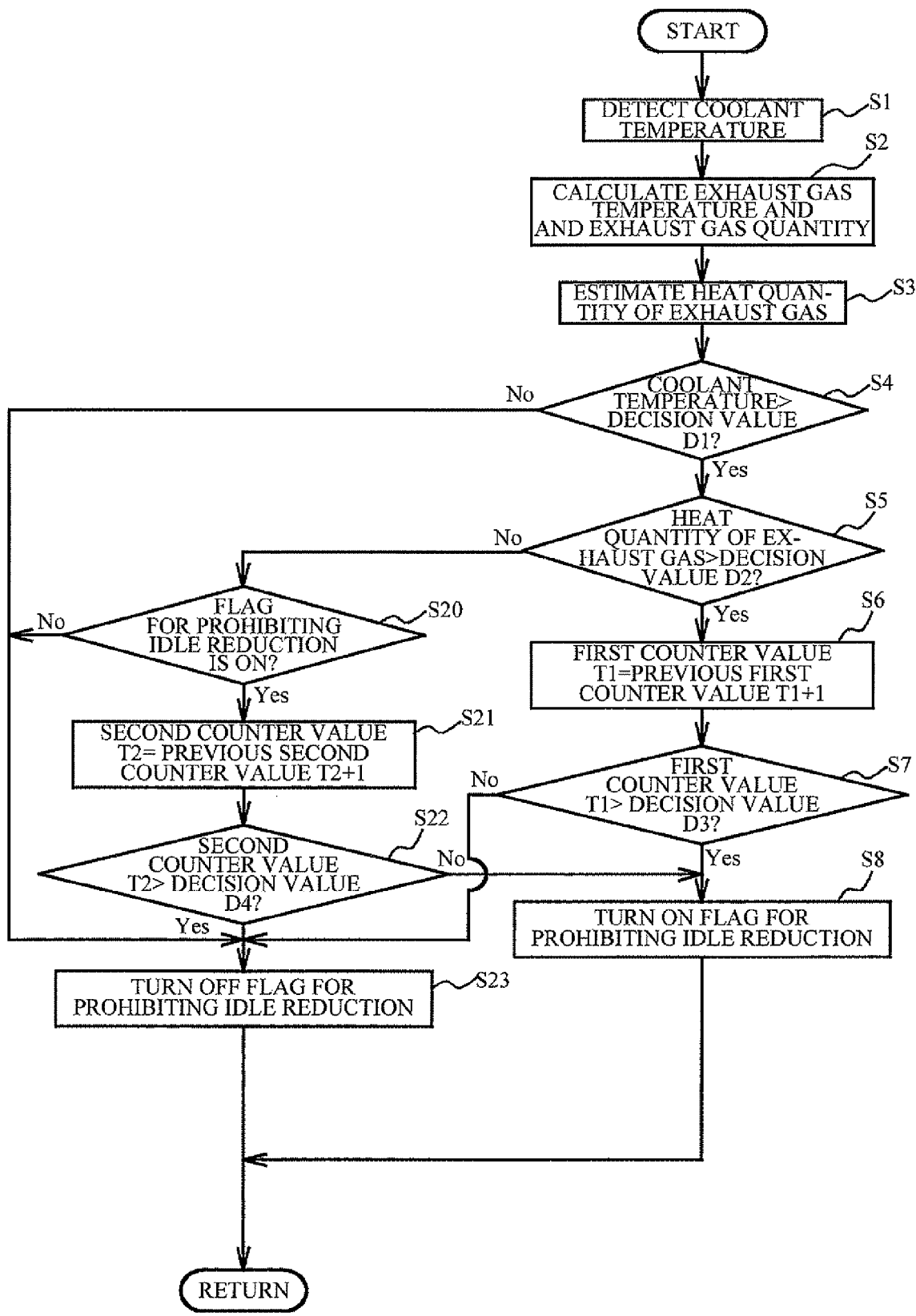
FIG. 3 is a flowchart of an example of a control performed by an ECU.

FIG. 3 is a flowchart of an example of a control performed by the ECUs 7L and 7R. The ECUs 7L and 7R detect a coolant temperature based on the outputs from the water temperature sensor 52 (step S1). Additionally, the coolant temperature may be estimated by a known method without depending on the outputs from the water temperature sensor 52.

Figure 4:
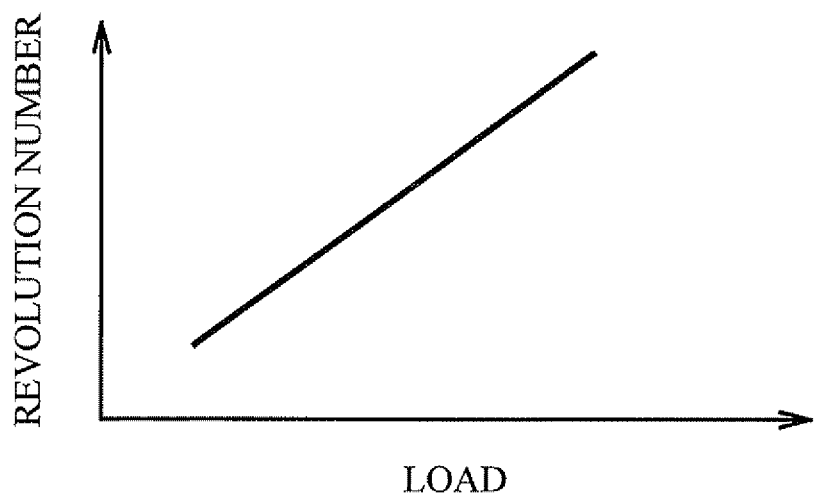
FIG. 4 is a map for calculating an exhaust gas temperature.

Next, the ECUs 7L and 7R calculate an exhaust gas temperature and an exhaust gas quantity (step S2). For example, the exhaust gas temperature is calculated based on a map illustrated in FIG. 4. FIG. 4 is a map for calculating the exhaust gas temperature, and is stored beforehand in the ECUs 7L and 7R. As illustrated in FIG. 4, the vertical axis indicates the revolution number of the engine 10, and the horizontal axis indicates the load of the engine 10. The exhaust gas temperature is calculated to be higher as the revolution number and the load of the engine 10 are higher. The exhaust gas temperature may be detected by a sensor.

Also, the exhaust gas quantity (g/sec) is calculated based on the intake air quantity detected by the outputs from the airflow meter 18 and the air-fuel ratio detected by the outputs from the air-fuel ratio sensors 9L and 9R. The exhaust gas quantity may be detected or calculated by another known method.

Next, the ECUs 7L and 7R estimate the heat quantity P of the exhaust gas (step S3). Specifically, this is estimated by the following formula.

$$P = M \times Cp \times (Tex - Tair) \quad (1)$$

M stands for exhaust gas quantity, Cp stands for specific heat of exhaust gas, Tex stands for exhaust gas temperature, and Tair stands for outside air temperature. The heat quantity P is calculated by substituting the exhaust gas quantity and the exhaust gas temperature calculated in step S2 into M and Tex respectively. Also, an outside air temperature may be detected by a known sensor, or estimated or calculated by a known method.

Next, the ECUs 7L and 7R decide whether or not the coolant temperature is higher than a decision value D1 (step S4). When the coolant temperature is higher than the decision value D1, the ECUs 7L and 7R decide whether or not the heat quantity of the exhaust gas is higher than a decision value D2 (step S5). Herein, the heat quantity of the exhaust gas is one calculated in step S3. When the heat quantity is higher than the decision value D2, the ECUs 7L and 7R set a previous first counter value T1 added with 1 as a current first counter value T1 (step S6). The first counter value T1 is a value used for measuring a period while the heat quantity of the exhaust gas is higher than the decision value D2.

Next, the ECUs 7L and 7R decide whether the first counter value T1 is higher than a decision value D3 (step S7). When the first counter value T1 is higher than the decision value D3, the ECUs 7L and 7R turn ON an idle reduction prohibition flag for prohibiting the idle reduction control (step S8). This is because the prohibition of the circulation of the coolant is prevented by prohibiting the idle reduction control so as to prevent boiling of the coolant caused by the heat quantities stored in the cooling units 40L and 40R. Further, when the first counter value T1 is higher than the decision D3, the period while the heat quantity of the exhaust gas is higher than the decision value D2 is estimated to be comparatively long. In such a case, the heat quantities stored in the cooling units 40L and 40R are estimated to be comparatively large.

When the first counter value T1 is not higher than the decision value D3 in step S7, the ECUs 7L and 7R turn ON the idle reduction prohibition flag (step S23). This is because, in this case, the heat quantities stored in the cooling units 40L and 40R are comparatively low, and the coolant is estimated not to boil even when the idle reduction control is performed.

When the coolant temperature is not higher than the decision value D1 in step S4, the idle reduction prohibition flag is turned OFF (step S23). This is because there is little possibility that boiling of the coolant is caused by the heat quantities stored in the cooling units 40L and 40R even after the idle reduction control is performed in cases where the coolant temperature is low to some extent.

When the heat quantity of the exhaust gas is not higher than the decision value D2 in step S5, the ECUs 7L and 7R decide whether or not the idle reduction prohibition flag is ON (step S20). When a negative decision is made, the ECUs 7L and 7R perform step S23. When an affirmative decision is made, the ECUs 7L and 7R calculate a previous second counter value T2 added with 1 as a current second counter value T2 (step S21). The second counter value T2 is used for measuring a period while the heat quantity of the exhaust gas is lower than the decision value D1.

The ECUs 7L and 7R decide whether or not the second counter value T2 is higher than a decision value D4 (step S22). When the second counter value T2 is higher than the decision value D4, the ECUs 7L and 7R perform step S23. This is because the heat quantities stored in the cooling units 40R and 40L are estimated to be low in this case. When the second counter value T2 is not higher than the decision value D4, the ECUs 7L and 7R turn ON the idle reduction prohibition flag (step S8). This is because the heat quantities stored in the cooling units 40R and 40L are estimated to be still enough in this case. The second counter value T2 corresponds to the period while the heat quantity of the exhaust gas is not higher than the decision value D2. Thus, whether or not to prohibit the idle reduction control is decided in response to the period while the estimated heat quantity of the exhaust gas is not higher than the decision value D2 and in response to the period while the estimated heat quantity of the exhaust gas is higher than the decision value D2. That is, whether or not to prohibit the idle reduction control is decided in response to the period while the estimated heat quantity of the exhaust gas is not higher than the decision value D2 and in response to the period while the estimated heat quantity of the exhaust gas is higher than the decision value D2. This can decide whether or not to prohibit the idle reduction control in consideration of the driving state of the engine 10.

As mentioned above, the ECUs 7L and 7R estimate the heat quantity of the exhaust gas, and decide whether or not to prohibit the idle reduction control in response to the estimated heat quantity. Therefore, when the heat quantity of the exhaust is high, the idle reduction control is prohibited, and then the pump 76 is continuously operated to circulate the coolant. It is thus possible to prevent boiling of the coolant caused by the heat quantities stored in the cooling units 40L and 40R.

Figure 5:
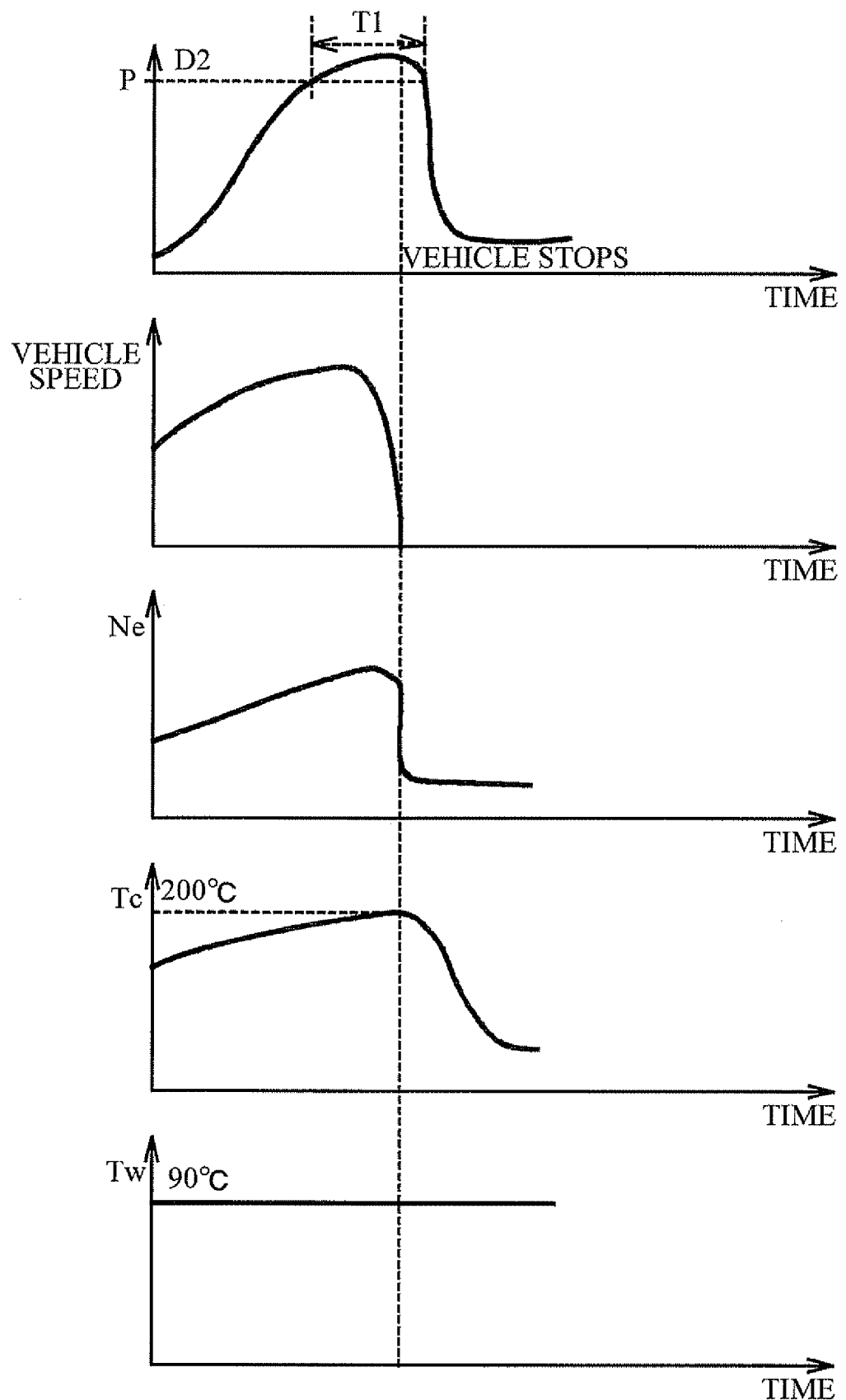
FIG. 5 is a timing chart to explain the control performed by the ECU.
Figure 6:
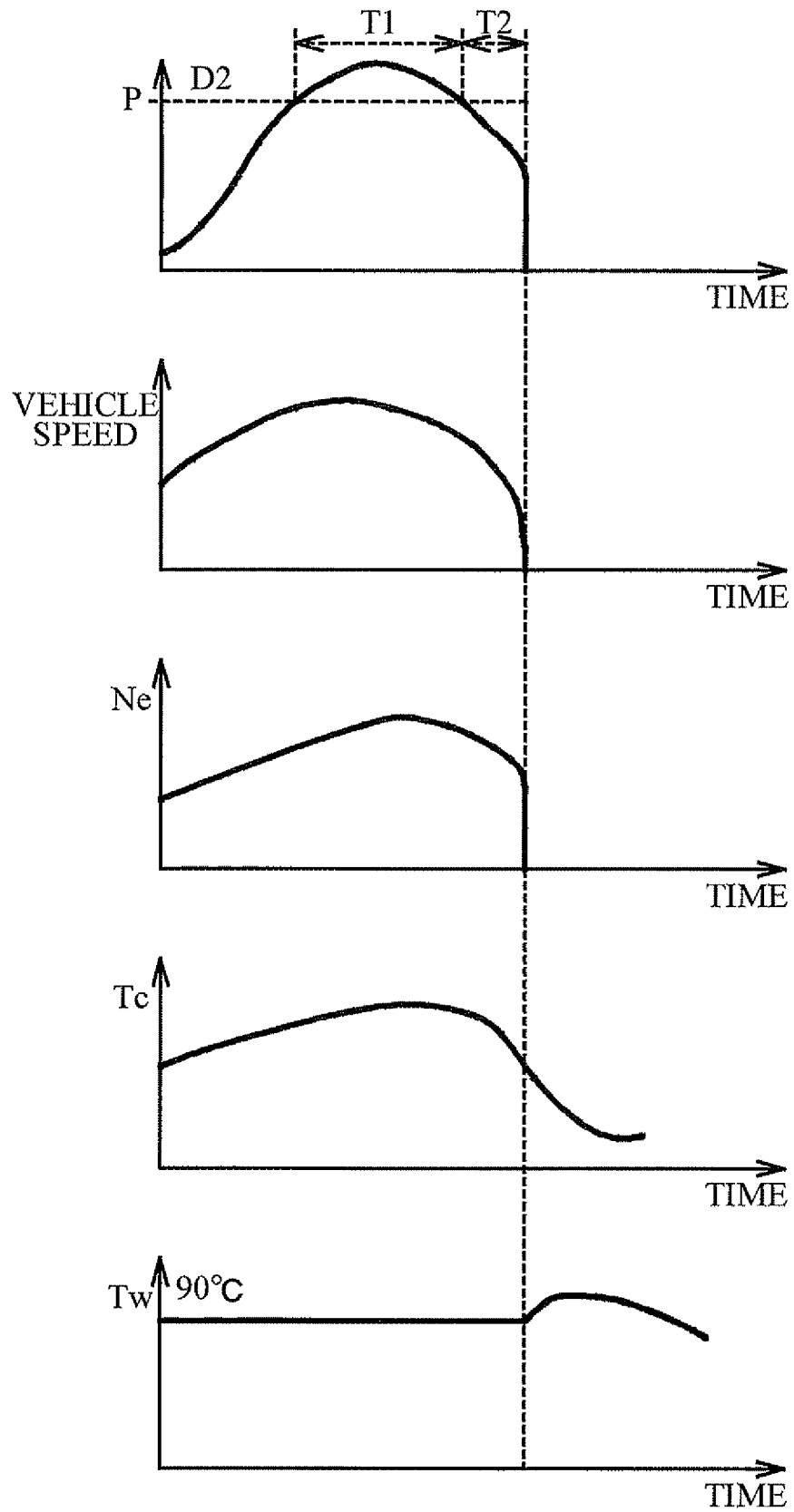
FIG. 6 is a timing chart to explain the control performed by the ECU.

Next, the control performed by the ECUs 7L and 7R will be described with reference to a timing chart. FIGS. 5 and 6 are timing charts to explain the control performed by the ECUs 7L and 7R. Additionally, the heat quantity P of the exhaust gas, the vehicle speed, the revolution number of the engine 10, the temperature Tc of the cooling units 40L and 40R, and the coolant temperature Tw are illustrated in FIGS. 5 and 6. Further, the coolant temperature Tw indicates the temperature of the coolant around the cooling units 40L and 40R.

FIG. 5 is the timing chart in cases where the idle reduction control is prohibited. For example, when a vehicle runs up a slope and continuously performs the high-revolution and high-load driving, the heat quantity P of the exhaust gas rises to be higher than the decision value D2. When the first counter value T1 corresponding to the period while the heat quantity P is higher than the decision value D2 is higher than the decision value D3, the idle reduction prohibition flag is turned ON. In cased where the vehicle speed is zero while the idle reduction prohibition flag is ON, the idle reduction control is not performed, and so the idling is performed. If the temperature Tc of the cooling units 40L and 40R is 200 degrees Celsius at the time when the idling is performed, the heat quantity P of the exhaust gas is drastically decreased by performing the idling, and then the temperature Tc of the cooling units 40L and 40R is also gradually decreased from 200 degrees Celsius. Further, since the engine 10 is continuously rotated at a low revolution number by performing the idling, in response to this, the pump 76 is continuously operated to continuously circulate the coolant. Therefore, the coolant temperature Tw remains about 90 degrees Celsius without being significantly changed before and after the vehicle stops. Such a manner can prevent boiling of the coolant caused by the heat quantities stored in the cooling units 40L and 40R.

It is supposed that the idle reduction control is performed when the heat quantity of the exhaust gas is high. In this case, the pump 76 is stopped, and then the coolant is not circulated. Thus, there is a possibility that boiling of the coolant remained within or around the cooling units 40L and 40R is caused by the heat quantities stored in the cooling units 40L and 40R. However, in the present embodiment, the idle reduction control is prohibited under given conditions to perform the idling. Therefore, the coolant is circulated until the heat quantities stored in the cooling units 40L and 40R are reduced. This can prevent the coolant from boiling.

Next, a case where the idling is performed will be described. FIG. 6 is the timing chart in cases where the idling is performed. As illustrated in FIG. 6, in cases where the vehicle stops when the heat quantity P is not higher than the decision value D2 after the heat quantity P is higher than the decision value D2, and in cases where the second counter value T2 corresponding to the period while the heat quantity P is not higher than the decision value D2 is higher than the decision value D4, the idle reduction is performed. Therefore, the engine 10 is stopped, so the pump 76 is stopped. However, since the heat quantity P of the exhaust gas just before the idle reduction is performed is comparatively low, the heat quantities stored in the cooling units 40L and 40R are also low. For this reason, even when the idle reduction control is performed, an increase in the coolant temperature is little. Thus, the coolant does not boil, even when the idle reduction control is performed in such a case. The fuel consumption can be suppressed by performing the idle reduction control.

Second Embodiment

Figure 7:
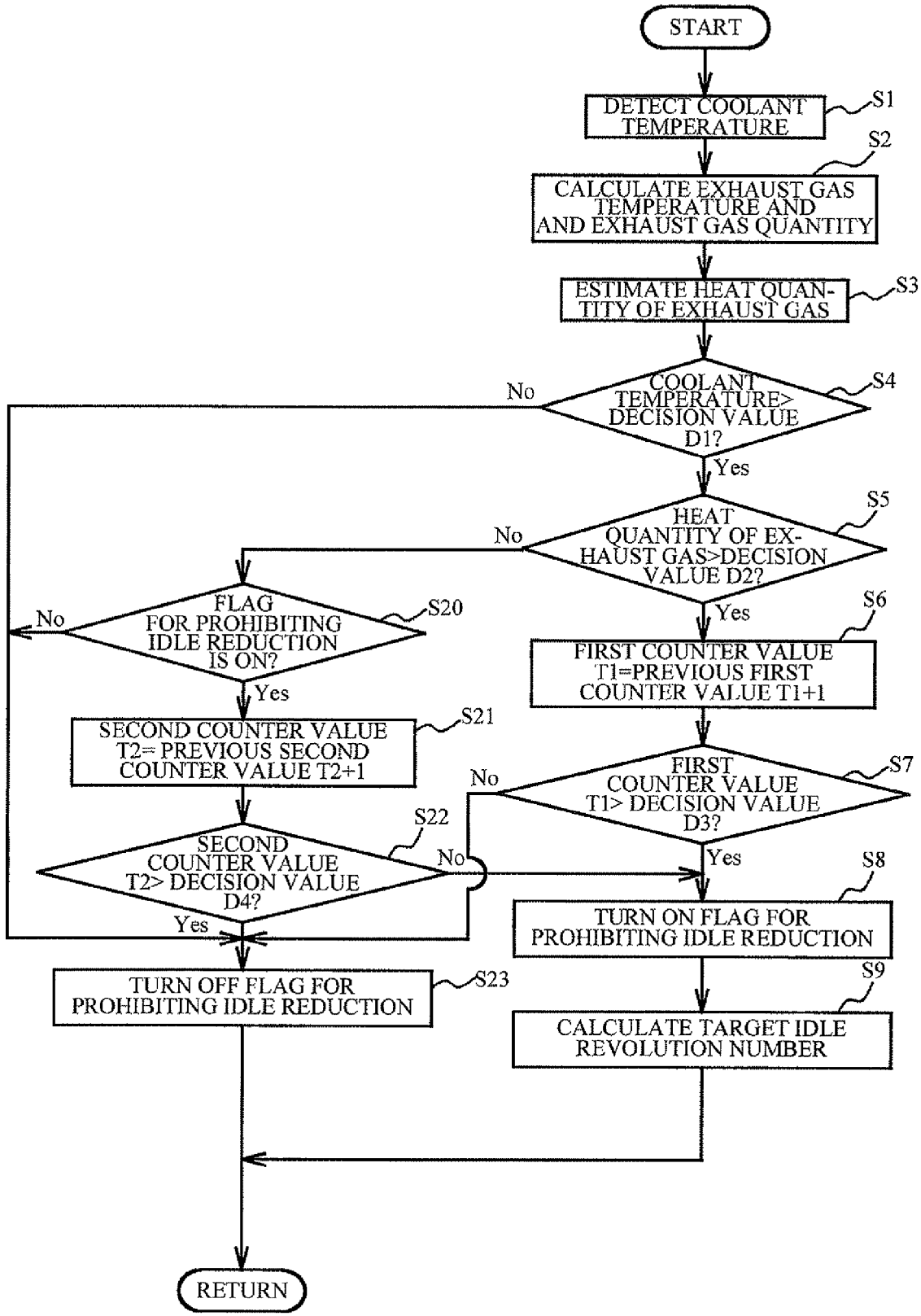
FIG. 7 is a flowchart of an example of the control performed by the ECU.

Next, the control device for the internal combustion engine according to a second embodiment will be described. FIG. 7 is an explanatory view of the path of the coolant of the control unit of the internal combustion engine according to the second embodiment. The control device for the internal combustion engine according to the second embodiment has similar components to that according to the first embodiment as illustrated in FIGS. 1 and 2.

Figure 8:
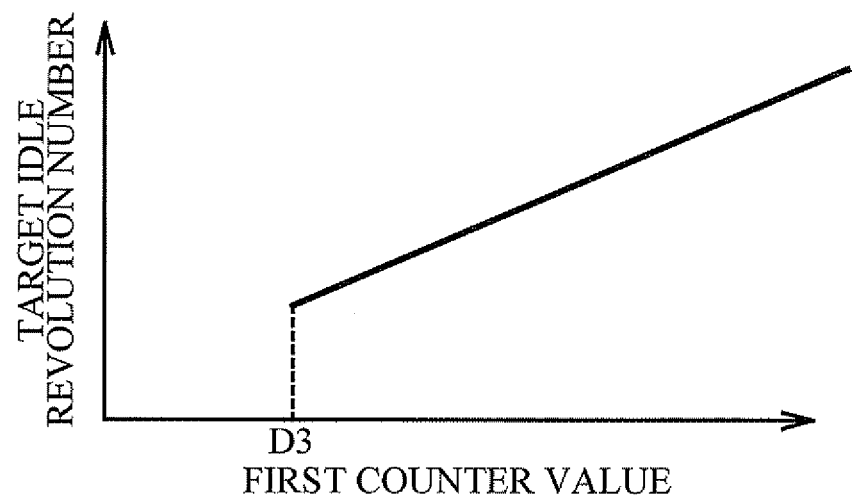
FIG. 8 is a map to calculate a target idle revolution number.

When the ECUs 7L and 7R perform steps S1 to S8, the ECUs 7L and 7R calculate the target idle revolution number at the time of the idling (step S9). FIG. 8 is a map to calculate the target idle revolution number. The map illustrated in FIG. 8 is stored beforehand in the ROM of the ECU 7L or 7R. In FIG. 8, the vertical axis indicates the target idle revolution number, and the horizontal axis indicates the first counter value T1. The target idle revolution number is higher as the first counter value T1 is higher. For example, when the first counter values T1 are 1000, 2000, 3000, and 4000, the idle revolution number is set to be 700, 1000, 1400, and 1800 (rpm), respectively.

As mentioned above, the first counter value T1 corresponds to the period while the heat quantity of the exhaust gas is higher than the decision value D2. Thus, the heat quantities stored in the cooling units 40L and 40R are estimated to be higher as the first counter value T1 is higher. Thus, the ECUs 7L and 7R set the target idle revolution number to be higher as the heat quantities stored in the cooling units 40L and 40R are higher. The flow velocity of the coolant circulated by the pump 76 is increased as the target idle revolution number is higher. Thus, the flow velocity of the coolant at the time of the idling is increased as the heat quantities stored in the cooling units 40L and 40R are higher. Therefore, even when the heat quantities stored in the cooling units 40L and 40R are high, the temperature of the cooling units 40L and 40R can be reduced immediately, in addition to the coolant can be prevented from boiling.

Third Embodiment

Figure 9:
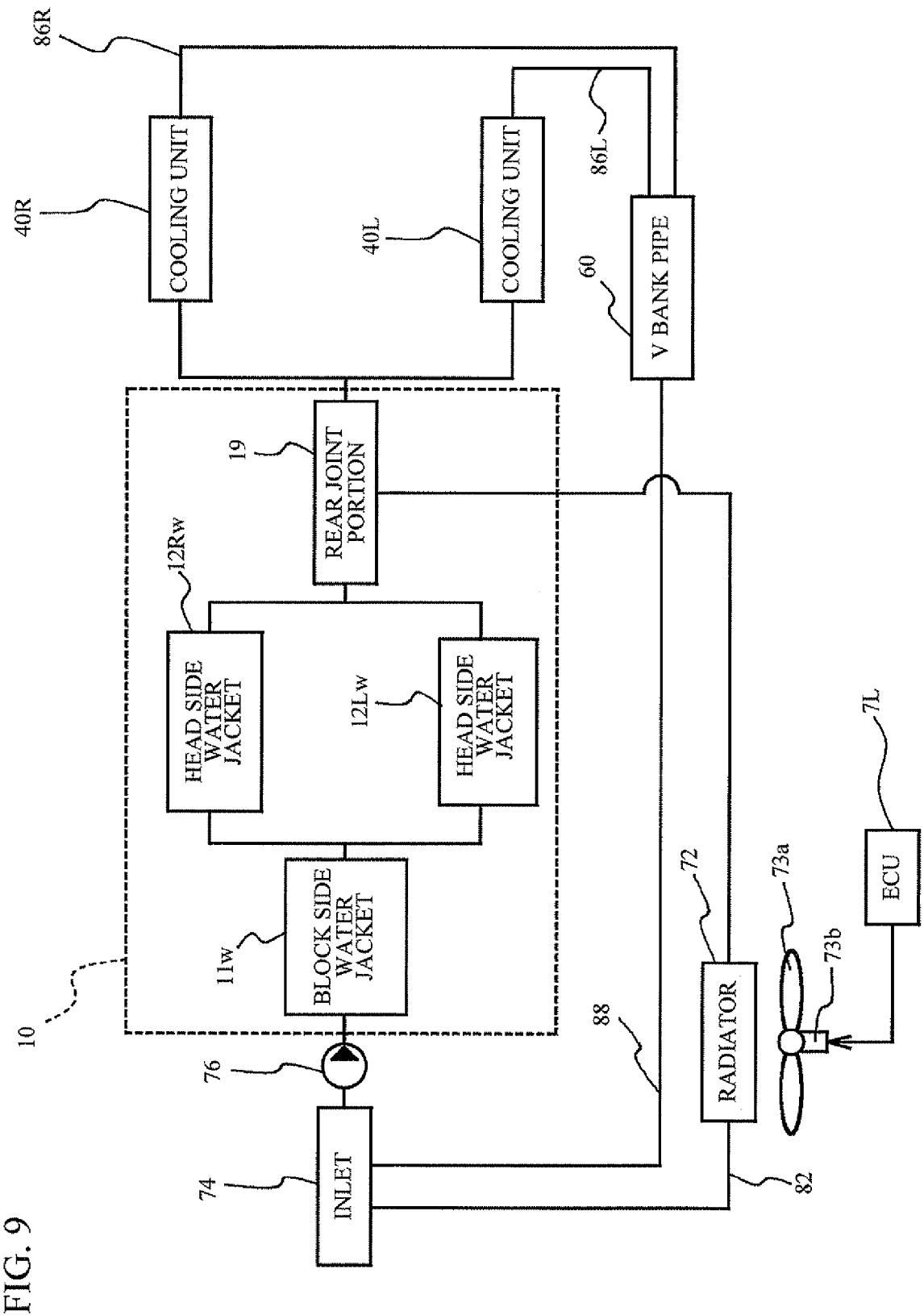
FIG. 9 is an explanatory view of a path of the coolant in the cooling device for the internal combustion engine according to a third embodiment.

Next, the control device for the internal combustion engine according to a third embodiment will be described. FIG. 9 is an explanatory view of the path of the coolant of the control unit of the internal combustion engine according to the third embodiment. As illustrated in FIG. 9, a radiator fan (hereinafter referred to as fan) 73a for cooling the radiator 72 is provided in the control device for the internal combustion engine according to the third embodiment. The fan 73a is operated by a motor 73b. The motor 73b is operated in response to instructions from the ECU 7L. The heat radiation of the coolant within the radiator 72 is promoted by the fan 73a. The fan 73a stops while the vehicle is running. At the time of running, the heat radiation of the coolant within the radiator 72 is promoted by the wind generated by running.

Figure 10:
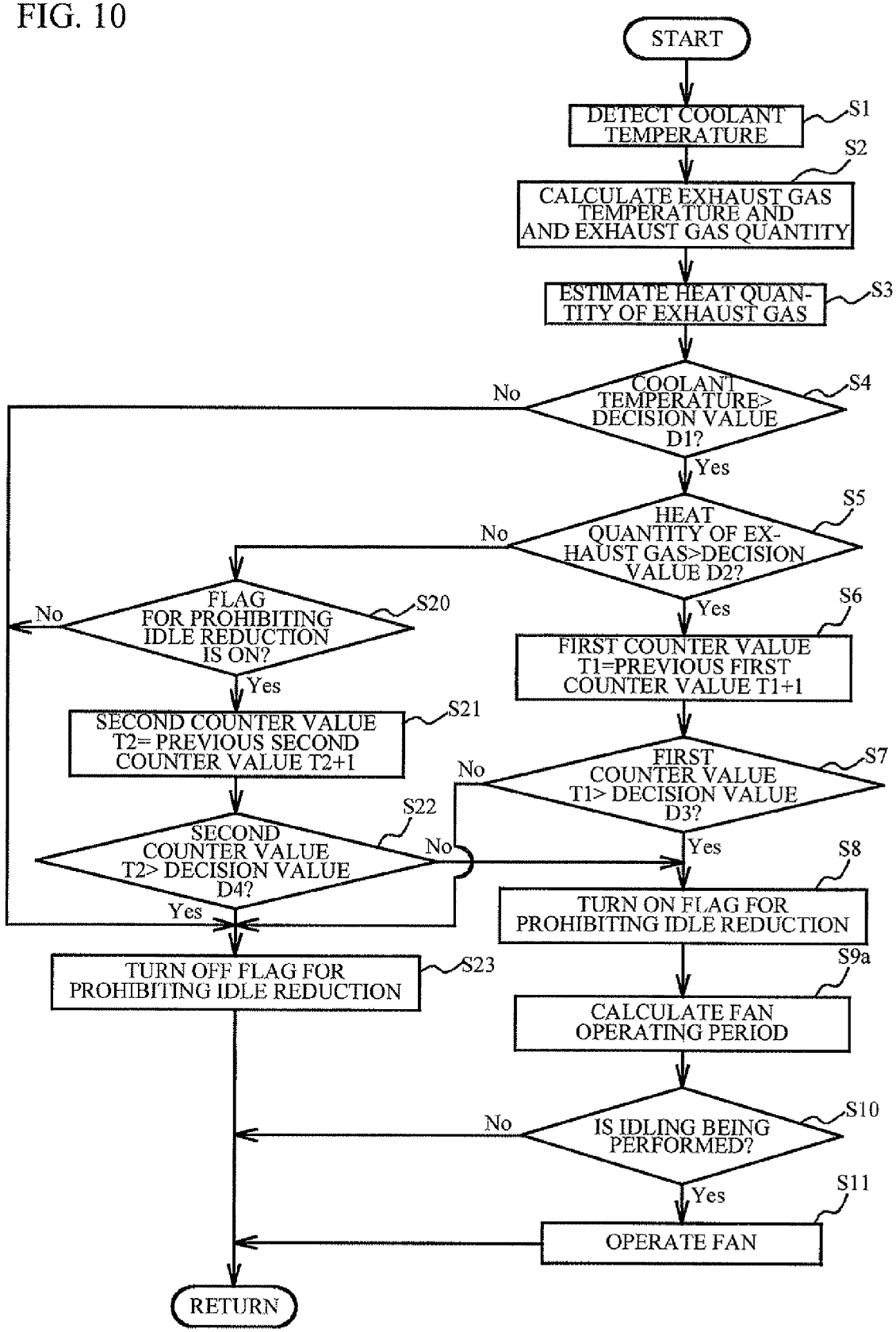
FIG. 10 is a flowchart of an example of the control performed by the ECU.
Figure 11:
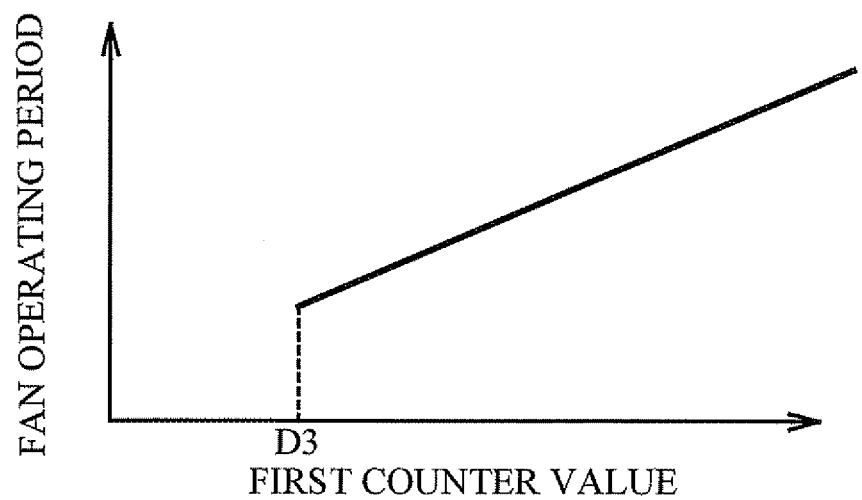
FIG. 11 is a map to calculate an operating period of a fan.

FIG. 10 is a flowchart of an example of a control performed by the ECUs 7L and 7R. When the ECUs 7L and 7R perform steps S1 to S8, the ECUs 7L and 7R calculate the operating period of the fan 73a (step S9a). Specifically, the operating period of the fan 73a is an operating period of the fan 73a during the idling. FIG. 11 is a map to calculate the operating period of the fan 73a. As for the map illustrated in FIG. 11, the vertical axis indicates the operating period of the fan 73a, and the horizontal axis indicates the first counter value T1. The map illustrated in FIG. 11 is stored beforehand in the ROM of the ECU 7L or 7R. As illustrated in FIG. 11, the operating period of the fan 73a is longer as the first counter value T1 is higher. For example, when the first counter values T1 are 1000, 2000, 3000, and 4000, the operating period of the fan 73a is set to be 30, 60, 90, and 120 (sec), respectively.

Next, the ECUs 7L and 7R decide whether or not the idling is being performed (step S10). When a negative decision is made, these series of processes are finished. When the idling is being performed, the ECU 7L instructs the motor 73b to operate the fan 73a.

In such a manner, the fan 73a is operated during the idling. This is because the heat radiation of the coolant is not promoted within the radiator 72 by the wind generated by running while the vehicle stops during the idling. Thus, the fan 73a is operated during the idling, thereby ensuring the heat radiation of the coolant within the radiator 72 during the idling. This prevents boiling of the coolant caused by the heat quantities stored in the cooling units 40L and 40R.

Further, the reason why the operating period of the fan 73a is set in response to the first counter value T1 is as follows. As mentioned above, the first counter value T1 corresponds to the period while the heat quantity of the exhaust gas is higher than the decision value D2. Thus, the heat quantities stored in the cooling units 40L and 40R are estimated to be higher as the first counter value T1 is higher. Thus, the coolant temperature becomes higher as the heat quantities stored in the cooling units 40L and 40R are higher. The coolant temperature is prevented from being increased by setting the operating period of the fan 73a in light of this situation. Also, the electrical power consumption with the operation of the fan 73a can be suppressed as much as possible by setting the operating period of the fan 73a in response to the heat quantities stored in the cooling units 40L and 40R.

Fourth Embodiment

Figure 12:
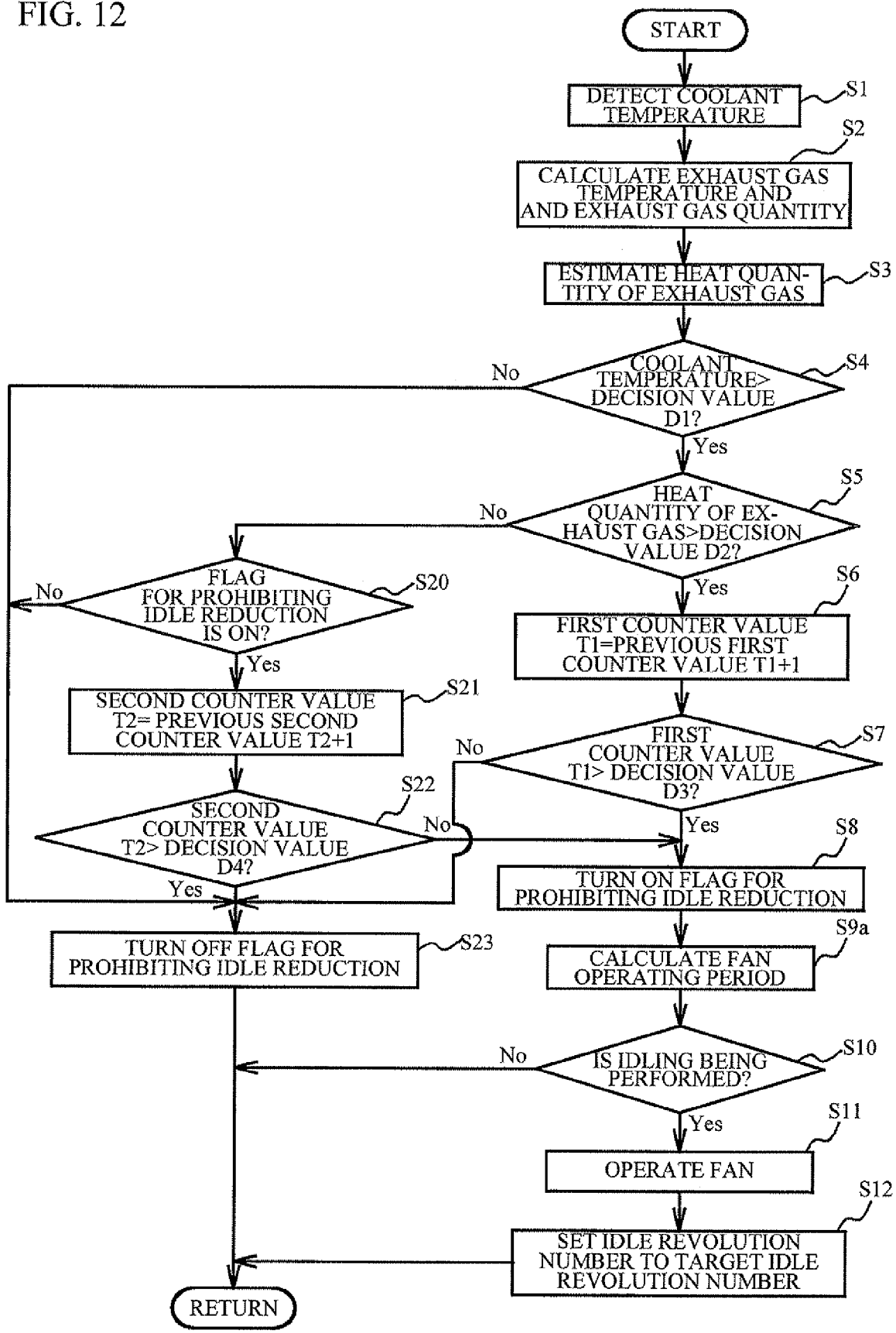
FIG. 12 is a flowchart of an example of the control performed by the ECU.

Next, a control performed by a control device for the internal combustion engine according to a fourth embodiment will be described. FIG. 12 is a flowchart of an example of the control performed by the ECUs 7L and 7R. Additionally, the control device for the internal combustion engine according to the embodiment 4 is equipped with the fan 73a and the motor 73b, like the control unit for the internal combustion engine according to the third embodiment.

The ECUs 7L and 7R calculate the target idle revolution number and the operating period of the fan 73a (steps S9 and S9a), after performing steps S1 to S8. The target idle revolution number and the operating period are calculated based on the map defined by the first counter value T1. Next, the ECUs 7L and 7R decide whether or not the idling is being performed (step S10). When an affirmative decision is made, the idle revolution number of the engine 10 is controlled to be the target idle revolution number, in addition, the fan 73a is operated (steps S11 and S12). The control for the target idle revolution number is performed by controlling the fuel injection quantity and the intake air quantity.

In such a way, the ECUs 7L and 7R control the idle revolution number and operate the fan 73a at the same time during the idling. This can prevent the coolant from being heated, and accelerate the cooling of the cooling units 40L and 40R.

While the exemplary embodiments of the present invention have been illustrated in detail, the present invention is not limited to the above-mentioned embodiments, and other embodiments, variations and modifications may be made without departing from the scope of the present invention.

The invention claimed is:

1. A control device for an internal combustion engine, comprising:
    a cooling unit arranged on a path where a coolant is circulated, and cooling an exhaust gas of the internal combustion engine with the coolant flowing through the cooling unit;
    an estimation portion estimating a heat quantity of the exhaust gas; and
    a control portion deciding whether or not to prohibit an idle reduction control in response to the estimated heat quantity of the exhaust gas,
    wherein the control portion sets a target revolution number of the internal combustion engine at the time of an idling, in response to a period while the estimated heat quantity of the exhaust gas is higher than a decision value.

2. The control device for the internal combustion engine of claim 1, wherein the control portion prohibits the idle reduction control when the heat quantity of the exhaust gas is higher than a decision value.

3. The control device for the internal combustion engine of claim 1, wherein the control portion decides whether or not to prohibit the idle reduction control, in response to a period while the estimated heat quantity of the exhaust gas is higher than a decision value and in response to a period while the estimated heat quantity of the exhaust gas is not higher than the decision value.

* * * * *